United States Patent [19]

Massa et al.

[11] Patent Number: 5,024,879
[45] Date of Patent: Jun. 18, 1991

[54] PROCESS FOR CONSOLIDATING DISCONTINUOUS-STRUCTURED MATERIALS

[75] Inventors: Vincenzo Massa, Busto Arsizio; Aldo Cicuta; Walter Cavigiolo, both of Novara, all of Italy

[73] Assignee: Ausimont S.p.A., Milan, Italy

[21] Appl. No.: 453,173

[22] Filed: Dec. 26, 1989

Related U.S. Application Data

[63] Continuation of Ser. No. 134,846, Dec. 14, 1987, abandoned.

[30] Foreign Application Priority Data

Dec. 17, 1986 [IT] Italy ................. 22718 A/86

[51] Int. Cl.$^5$ .................... C23C 16/04; B32B 3/26
[52] U.S. Cl. .................... 428/304.4; 428/500; 428/521; 427/140; 427/255.6; 427/385.5
[58] Field of Search ............ 427/255.6, 385.5, 237, 427/140; 428/521, 304.4, 500

[56] References Cited

U.S. PATENT DOCUMENTS

| | | | |
|---|---|---|---|
| 3,397,085 | 8/1968 | Cariou et al. | 427/255.6 |
| 3,573,968 | 4/1971 | Loeb et al. | 427/255.6 |
| 3,753,773 | 8/1973 | Lee | 427/255.6 |
| 3,900,600 | 8/1975 | Spaulding | 427/255.6 |
| 3,901,994 | 8/1975 | Mehalso et al. | 427/255.6 |
| 3,908,046 | 9/1975 | Fitzpatrick et al. | 427/255.6 |
| 4,225,647 | 9/1980 | Parent | 428/336 |
| 4,291,244 | 9/1981 | Beach et al. | 427/255.6 |
| 4,291,245 | 9/1981 | Nowlin et al. | 427/255.6 |
| 4,331,722 | 5/1982 | Packo et al. | 427/237 |
| 4,495,889 | 1/1985 | Riley | 427/255.6 |
| 4,518,623 | 5/1985 | Riley | 427/255.6 |
| 4,572,846 | 2/1986 | Foss et al. | 427/255.6 |

OTHER PUBLICATIONS

Kirk-Othmer, Encyclopedia of Chemical Technology, Third Edition, vol. 24 pp. 746-747, John Wiley & Sons.

*Primary Examiner*—Norman Morgenstern
*Assistant Examiner*—Margaret Bueker
*Attorney, Agent, or Firm*—Stevens, Davis, Miller & Mosher

[57] ABSTRACT

Process for consolidating solid materials and/or articles, which exhibit at least a low cohesion degree area associated with at least one structural discontinuity, debouching or opening into the surface and/or pervious from the surface of said material and/or article, with ports or openings having sizes equal to at least 0.01 micron, which process comprises:

(a) introducing into said low-cohesion area associated with a structural discontinuity vapors of at least one p-xylylene monomer and/or a monomer derivative thereof, operating under vacuum, and (b) polymerizing said monomer vapors in situ inside said low-cohesion area associated with said structural discontinuity.

6 Claims, No Drawings

PROCESS FOR CONSOLIDATING DISCONTINUOUS-STRUCTURED MATERIALS

This application is a Continuation of application Ser. No. 134,846, filed Dec. 14, 1987, now abandoned.

DESCRIPTION OF THE INVENTION

The invention relates to a process for consolidating materials having a discontinuous structure.

More particularly, the present invention relates to a process directed to the consolidation of materials and/or articles endowed with a low cohesion degree associated with structural discontinuities, by using reactive monomers.

The process is effectively useful for materials which, independently of their chemical and/or structural nature, exhibit a low cohesion degree associated with discontinuities in the structure.

As the total cohesion degree of a structure corresponds to the degree or extent of the weakest portion thereof, the invention is specifically suited for the treatment of materials which exhibit cohesive resistance dishomogeneities no matter how they originated, including weakening occurring with respect to their original condition owing to degradation, damage, deterioration and the like, attributable to aging, wear, chemico-physical attacks, mechanical stresses, or to any other factors.

It is generally known that materials having specific values of mechanical resistance are prepared, in general, by properly selecting components and processing modalities beginning with the planning phase. In this manner it is possible to obtain the wide range of metallic, ceramic, polymeric, etc., composite materials which nowadays are at the disposal of the most diverse applicative industrial sectors.

The techniques utilized so far are substantially different from one another, depending on the nature of the material and on the requirements of use. For example, in the case of polymeric materials, the use of fibrous reinforcing agents in the processing of thermoplastic polymers; the addition of reactive resins (urea resin, melamine resin, etc.) to the fiber mix in the manufacture of moisture-resistant paper, use of fiber-blends comprising a component (for example a polychlorovinyl component) susceptible of melting in consequence of a limited heat-treatment, thereby imparting cohesion to the web, in the manufacture of non-woven cloths; bringing about cohesion by impregnation with polymeric binders in the manufacture of non-woven; the use of aminic, phenolic, polyisocyanic, etc., glues in the manufacture of wood shaving panels; etc.

The above techniques, as well as many other techniques not mentioned herein for the sake of brevity, are all capable of imparting cohesive energy to the materials, and they are well known to those skilled in the various arts where they are broadly used in industrial practice.

In other cases which are closer to the scope of the present invention, it appears advisable to bring about consolidation, i.e., to increase the cohesive energy of materials which possess it only to a low degree. This may involve the transformation of materials suitable for certain uses into other materials having higher or better characteristics and therefore capable of meeting higher requirements of use; or it may involve the restoring of the original degree of resistance to mechanical stresses, or at any rate the improvement of the residual cohesion of materials which have undergone degradation caused by various factors, such as aging, mechanical stresses, chemico-physical attacks, etc.

The consolidation treatments which are usually carried out are generally the following:

(a) treatments of a mechanical nature, which consist in applying properly selected reinforcing elements to the piece to be consolidated, making use, according to the need, of riveting, sewing, welding, slings, etc.;

(b) treatments of a chemical nature, which consist in introducing into the micro-macroscopic discontinuities of the piece or material an adhesive agent susceptible of generating an additional cohesive force in the article thus obtained.

To achieve a chemical consolidation it is necessary therefore to have available a product capable of penetrating into the pores and microdiscontinuities of the piece to be treated, of adhering to the inner surfaces of the pores and discontinuities, and of generating an adhesive and cohesive energy which will be adequate to the specific requirements.

The techniques of the art are based on the following processes:

(a) Application of products which have been brought to the molten state by means of heating, and subsequent solidification thereof due to temperature decrease; among the products utilized for this purpose there may be cited: natural waxes, paraffin waxes, synthetic thermoplastic polymers such as, for example, ethylene-vinyl acetate copolymers, polyesters, polyamides, etc. However, this method has its limitations in the resistance to thermal stresses of the material to be treated, because high temperatures (even as high as 300°–400° C.) are required to obtain sufficiently low viscosities to permit the penetration of high molecular weight products.

(b) Application of products in the form of solutions or dispersions in a continuous medium (vehicle), which may be water or an organic solvent of diverse nature (hydrocarbons, alcohols, esters, ketones, etc.); the subsequent removal of the vehicle, effected by evaporation (optionally accelerated by ventilation, heating, aspiration, etc.), brings the consolidating product back to the solid state of high cohesive energy. Such methodology comprises, for example, the use of terpene resins, cellulose nitrate, polyacrylates and polymethacrylates, polyvinylacetate, polyvinyl alcohol, etc. Penetration can be improved by lowering the viscosity of the solution or of the dispersion by an increase in dilution or the use of surfactants; however, this involves, as regards the vehicle removal, increasing difficulties in terms of time and of evaporation energy. This aspect is particularly disadvantageous since the vehicle, during the removal step, tends to entrain backward the consolidating material, thereby bringing it back to the outer surface of the treated piece; such phenomenon, which becomes stronger when operating at increasing dilutions, represents a significant drawback of this technique.

Another shortcoming is the possible sensitivity of the materials to be treated towards a vehicle component or a plurality of vehicle components (water, organic solvents); generally, as regards the organic solvents, problems of inflammability, toxicity, disagreeable smell, etc. are often encountered, which too are prejuidicial to the use of this technique.

(c) Application of reactive monomers or prepolymers, in the state of low-viscosity liquids, capable of giving rise, in situ, to macromolecular polymeric products by virtue of various mechanisms, such as the reciprocal reactivity of two mixed components on application (for example, epoxy resins), or catalysis induced on the surface of the material to be consolidated by the action of humidity (for example, silanes), or by neutralization of polymerization inhibitors (for example, cyanoacrylates), etc.

The drawbacks reside in the difficulty of causing the consolidating agent to penetrate into the piece or article undergoing treatment, because its initial viscosity, although low, rapidly rises—once the polymerization reaction has started—in consequence of the molecular weight increase, until a situation of immobility, and therefore of solidification is brought about.

Known, too, is the use of polymers of p-xylylene and derivatives thereof for providing coatings on various substrates for the purpose of their chemical and/or physical protection. The treatment is carried out, under vacuum, by depositing onto an article the p-xylylene monomer and/or a monomer derivative thereof in the vapor state and then causing polymerization in situ.

The above technique is advantageously adopted for providing protective coatings on a plurality of continuous-structured substrates, which include articles made of metallic, ceramic, polymeric, composite materials, etc. Among its most significant utilizations are cited: electric circuit components, logic circuits, mirrors and lenses; watches and clocks, coins, medals and the like; furnishings of ceramic, porcelain, glass; ammunition and explosives; paints, documents, photographs; etc.

In particular, this technique permits one to obtain conformal coatings; namely, continuous and impervious protective coatings on articles of any shape, following the irregularities thereof, even if small, with a uniform thickness.

It has now been discovered, in accordance with the present invention, that the consolidation of materials and/or articles having a low cohesion degree associated with structural discontinuities, may be efficaciously obtained, without encountering the above-cited drawbacks, if such structural discontinuities are filled or tamped with polymers obtained in situ from vapors of p-xylylene monomer and/or a monomer derivative thereof.

Thus, the object of the present invention is a process for the consolidation of solid materials and/or articles which exhibit at least a low cohesion degree area associated with at least a structural discontinuity, debouching or opening into the surface and/or pervious from the surface of said material and/or article, with ports or openings having dimensions equal to at least 0.01 micron, which process comprises:

(a) introducing into said low-cohesion area associated with structural discontinuities vapors of at least one p-xylylene monomer and/or a monomer derivative thereof, operating under vacuum at a pressure ranging approximately from 0.01 to 1 mm Hg, and (b) polymerizing said monomer vapors in situ inside said area having a low cohesion associated with a structural discontinuity.

The process according to the present invention is therefore particularly directed to the consolidation of solid materials and/or articles of organic and/or inorganic nature, which are more completely specified hereinafter, which are characterized by the presence of at least one area having a low cohesion degree associated with at least one originally existing and/or later occurred structural discontinuity, such as, e.g., pores, clefts, cracks, flakings, chippings, microholes, etc., having sections with dimensions ranging from 0.01 μm to 100 μm, pervious from the outside and communicating therewith through a port or opening equal to at least 0.01 μm, the dimensions of which port or opening are equal in size to or less than the section dimensions of the said structural discontinuity, i.e., 0.01 μm to 100 μm.

The term "low cohesion degree", whenever used herein, refers with respect to mechanical strength values lower than 700 kg/cm$^2$ to tensile stress and/or lower than 100 kg/cm$^2$ with respect to pressure, such values varying as a function of the different materials and/or structures of the articles.

The para-xylylene utilized for the purpose of this invention corresponds to formula I:

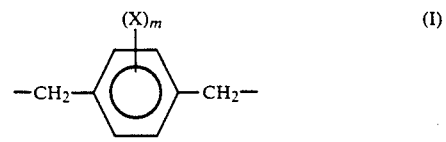

wherein X is a $C_1$-$C_6$ alkyl, $C_6$-$C_{10}$ aryl, $C_7$-$C_{16}$ aralkyl, halogen-alkyl or halogen-aralkyl, acetoxy, alkenyl, aminoalkyl, arylamino, cyano, alkoxy, hydroxyl, nitro group, a halogen atom, a sulphonic radical and a sulphonic ester, phosphorus-based substituents, sulphonic, sulphuric, alkyl-sulphoxide groups, or a hydrogen atom, and m is an integer from 0 to 4.

Since its reactivity gives rise to serious problems of storing and handling, in practical applications it is advisable to start from para-xylylene dimer, or (2,2)-paracyclophane, corresponding to formula II:

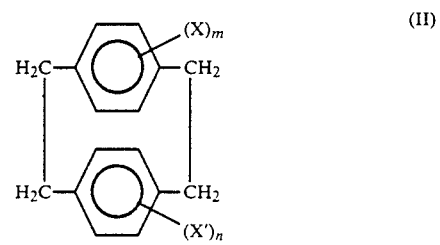

wherein X and X', either like or different from each other, and m and n, either like or different from each other, are defined as specified above for X and m, respectively. This dimer is a crystalline solid, stable at room temperature, easy to store and to handle.

The para-xylylene monomer having formula (I) is applied to the material to be consolidated, as defined above, according to the so-called "vapor vacuum deposition" technique.

According to such technique, the divalent radicals of the para-xylylene or derivatives thereof having formula (I) are produced under vacuum by pyrolysis, at temperatures higher than 400° C., of the corresponding (2,2)-paracyclophane of formula (II), thereby forming vapors of reactive radicals of formula:

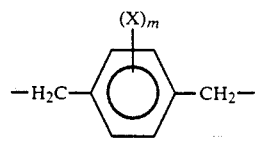

-continued

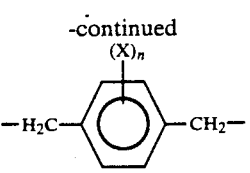

wherein X and X', m and n are as defined hereinbefore.

When m and n are equal and the substituents on each ring are equal, two moles of the same para-xylylene radical are formed which, by condensation, give rise to a substituted or non-substituted para-xylylene homopolymer. Conversely, when m and n are different or when substituents X and X' in each radical are different, their condensation leads to the formation of p-xylylene copolymers.

The p-xylylene divalent radicals condense and polymerize in situ almost instantaneously in the structure, thereby forming a compact polymer.

The process according to the present invention is conducted at a pressure of approximately from 0.01 to 1 mm Hg.

For producing the vapors of reactive divalent radicals of para-xylylene having formula (I) on the treated surface of a substrate, one may utilize any conventional apparatus such as that described in Kirk-Othmer Encyclopedia of Chemical Technology, Third Edition, Vol. 24, pages 746–747.

Generally, said apparatus includes a chamber suitable for containing the substrate to be consolidated, maintained at a temperature below 200° C., or in general lower than the condensation temperature of the particular type of para-xylylene used. The chamber communicates with a vaporization-pyrolysis furnace through a labyrinthine passage. The furnace is maintained at a temperature sufficient to vaporize and pyrolyse (2,2)-paracyclophane or its derivatives. Said (2,2)-paracyclophane or a derivative thereof is kept in the furnace as long as is necessary for it to vaporize and pyrolyse in order to form the corresponding para-xylylene divalent radicals.

Said radicals pass into the deposition chamber and, coming into contact with the surface of the material or article to be treated according to the present invention, penetrate and polymerize in situ inside the discontinuity, thereby consolidating said material and article.

The material or article to be treated may be previously subjected to a preliminary cleaning and/or washing treatment making use, for example, of water, organic solvents (lower alcohols, hydrocarbons, chlorinated hydrocarbons, etc.).

Furthermore, the application of the para-xylylene monomer of formula (I) is compatible with the optional use of adhesion promoters which are usually utilized in the field of the above vapor vacuum deposition technique, such as, for example, siloxane compounds, phosphoric derivatives, etc.

Suitable p-xylylene monomers of formula (I) are, for example, dichloro-p-xylylene (a derivative of dichloro-(2,2)-paracyclophane), cyano-p-xylylene, iodo-p-xylylene, fluoro-p-xylylene, hydroxymethyl-p-xylylene, ethyl-p-xylylene, methyl-p-xylylene, aminomethyl-p-xylylene, carbomethoxy-p-xylylene, and mixtures thereof.

Said technique is preferably applied to structures which, irrespective of the chemical nature of the components and the assembling modalities thereof, exhibit a low cohesion degree and therefore enable one to better appreciate and achieve the consolidating effect occurring by virtue of the adhesive action three-dimensionally exerted in the material and/or article by the polymeric phase derived from p-xylylene of formula (I) whether as such or substituted.

The structures may be those of differently degraded articles which exhibit cracks and/or flakings etc., where the resistance in the points of discontinuity is so low, for example, that it cannot withstand weak stresses such as those exertable by a nail, etc.

The para-xylylene, either as such or substituted, having formula (I) in the state of monomeric vapor actually possesses a high capability of penetrating into cracks and pores of the materials if they have dimensions of the order of one hundredth of a micron or higher, by virtue of its aeriform physical state, which involves a high diffusion rate and the absence of practically significant viscosity phenomena.

As a consequence, one may cause the reactive monomer to penetrate very deeply into the piece, such depths of penetration being of the order of one millimeter or of one centimeter as a function of the number, width, distribution, and interconnection of the pores, cracks and other discontinuities.

The reactive monomer, after having penetrated into and pervaded the above-mentioned structural microdiscontinuities, undergoes, due to cooling, a polymerization in situ, while simultaneously adhering to the inner surfaces of the piece. The resulting polymeric phase, hence, is capable of promoting the cohesion of the treated piece by adding to the pre-existing cohesion resistance of the starting structure a consolidating effect due to the multiaxial adhesive action of the polymeric material. The above-described technique is applicable to any material or structure exhibiting pores, cracks, holes and analogous pervious open cavities having dimensions of the order of one hundredth of $\mu$m or higher and therefore suitable for permitting an intimate penetration of para-xylylene, either as such or substituted, in the state of monomeric vapor.

Typically, this class of materials and structures includes, for example, materials consisting of natural, artificial or man-made fibers, conglomerated, manufactured articles based on wood, cork, asbestos, leather, etc., including composite structures comprising one or more of the aforesaid materials. Another group of materials treatable according to the present invention is represented by polymeric structures characterized by discontinuities as defined hereinabove and, in consequence, by perviousness to gases and vapors, however induced, such as foamed materials, etc., including composite structures comprising one or more of the above materials, as well as compact polymeric structures, which, therefore, are normally impervious to gases and vapors, if they exhibit cracks, holes or similar anomalies susceptible of being consolidated by an adhesive action.

Suitable for consolidation according to the present invention are also non-glazed ceramic materials, which are characterized by a non-molten skeleton with freely communicating, and therefore pervious to gases and vapors, pores, such as earthenwares, faiences, baked clays, tiles, refractory materials, etc., as well as glazed ceramic materials having closed non-communicating, and therefore normally impervious to gases and vapors, pores, such as porcelains, majolicas, gres, etc., if they exhibit cracks, flakings or similar anomalies susceptible of being consolidated by an adhesive action.

Also materials of a mineral nature, such as for example tuffs, sandstones, pumices, marbles, travertines, etc., are similarly treatable.

The consolidation of articles, according to the present invention, contemplates not only an increase in the mechanical strength characteristics, but also, more generally, an increase in the degree of toughness with respect to a plurality of chemico-physical stresses toward which the polymers obtained from para-xylylene, either as such or substituted, are more or less inert. This is the case, for example, of acid, alkaline, saline reagents; of corrosive fluids or solvents, such as water and the aqueous solutions of ionic or covalent compounds, or such as organic solvents (hydrocarbons, alcohols, esters, ketones, amines, etc.); of oils and fats; of agressive environments due to the presence of ozone, of carbon, nitrogen, sulphur oxides etc., of halogens, of moisture, etc.

The articles or materials treated according to the present invention exhibit towards the above-cited chemico-physical stresses an increased solidity or resistance as compared with the original article or material due to the formation in the structure of bonds based on poly-para-xylylene, which secure a certain cohesive effect in spite of the weakening action that the stresses can exert on the original portions even when their chemico-physical inertia is lower.

Furthermore, the high biological compatibility of para-xylylene either as such or substituted, connected with its marked chemical inertness does not limit in any way the use, in the biomedical and sanitary field, of articles treated according to the present invention.

Another object of the present invention is the possibility—by virtue of the optical, electrical and, more generally, chemico-physical properties (friction coefficients, free surface energies, state transition temperatures, etc.) which are typical of the polymers of p-xylylene, either as such or substituted—to reduce to the minimum any possible undesired variations in the characteristics of the consolidated pieces.

It is possible, for example, to carry out treatments which leave practically unaltered an original degree of porosity of a piece, although using applied polymer amounts which are suitable for attaining a significant increase in the degree of consolidation and adjusting it as desired through variations of the applied amount of polymer.

It is furthermore possible to adjust the amount of consolidating agent deposited onto or within the article in such manner that the treated article will substantially retain its original characteristics of appearance and touch, which is a very important consideration for example in the case of articles of cultural value, such as artistic testimonies, archaeological finds, museum pieces, etc.

Still further details of the present invention will become apparent from the following examples, which are merely illustrative and are not to be construed as limiting the invention in any manner whatsoever.

EXAMPLE 1

A substrate consisting of 4 small cubes of refractory material, with sides of 2.5 cm, was placed into the vapor deposition chamber of an apparatus for the polymerization of dichloro-(2,2)-paracyclophane. Vaporized were 200 g of dichloro-(2,2)-paracyclophane at 200° C. and 50 μm of mercury. The vapors were heated in a quartz tube maintained at 640° C. in order to pyrolyze dichloro-(2,2)-paracyclophane and to form the corresponding chloro-p-xylylene divalent radicals. The radicals were introduced into the vapor deposition chamber maintained at a temperature lower than 70° C., where they condensed onto the substrate surface to form the poly-chloro-p-xylylene polymer.

The samples, subjected to compression tests, exhibited a tensile stress almost equivalent to those of the non-treated samples, but a slower decay. The test pieces did not break but, even when deformed, substantially retained their starting cubic form.

EXAMPLE 2

Example 1 was repeated but using as a substrate 12 cubes of refractory material having sides of 2.5 cm, except for the following variations: the vapors were heated in a quartz tube to 600° C. in order to pyrolyze dichloro-(2,2)-paracyclophane to provide the corresponding chloro-p-xylylene divalent radicals. The obtained results were quite analogous to those described in Example 1.

EXAMPLE 3

Example 1 was repeated but using as a substrate 3 fragments of tiles of archaeological refractory material coming from Ebla, dating back to the 3rd millennium B.C., except for the following variations: there were vaporized 200 g of dichloro-(2,2)-paracyclophane at 200° C. and 50 μm of mercury. The vapors were heated in a quartz tube maintained at 640° C. in order to pyrolyze dichloro-(2,2)-paracyclophane to form the corresponding divalent radicals of chloro-p-xylylene.

The treated articles did not exhibit alterations in their appearance; furthermore, the oily touch and the tendency to dusting were eliminated (absence of microfragments during handling); cracks, flakings and analogous defects were further consolidated, as their tendency to propagation was stopped, such effect being evaluated by slightly stressing the discontinuities with a nail.

EXAMPLE 4

Example 1 was repeated but using as a substrate a net made of polyvinylidene chloride raffia diagonally woven, weighing 475 g/m$^2$.

The treated sample exhibited a full and springing hand and a remarkably increased strength with respect to weft breaking.

EXAMPLE 5

Example 1 was repeated but using as a substrate a polyester non-woven weighing 120 g/m$^2$ of the type suited as paddings for clothing.

The treated sample exhibited a very soft and full hand with an utmost agreeable heat effect and with a good mechanical strength.

What is claimed is:

1. A process for consolidating, that is, adhering a solid material or article which exhibits at least one area of low cohesion exhibiting a mechanical strength value lower than 700 kg/cm$^2$ with respect to stretching or lower than 100 kg/cm$^2$ with respect to compression, the said solid material or article being associated with at least one structural discontinuity having a section dimension ranging from 0.01 micron to 100 microns, pervious from the outside and communicating with the outside through a port equal in size to or less than the size of the section dimension of the structural discontinuity, which process comprises:

(a) introducing into said low-cohesion area associated with a structural discontinuity vapors of at least one para-xylylene monomer or monomeric derivative thereof corresponding to formula I:

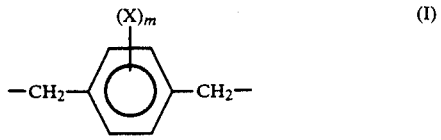

wherein X represents a $C_1$–$C_6$ alkyl group, a $C_6$–$C_{10}$ aryl group, a $C_7$–$C_{16}$ aralkyl group, a halogen-alkyl or halogen-aralkyl group, an acetoxy, alkenyl, aminoalkyl, arylamino, cyano, alkoxy, hydroxy, nitro group, a halogen atom, a sulphonic radical or a sulphonic ester, or a phosphorus-based substituent, a sulphonic, sulphuric, or alkyl-sulphoxide group, or a hydrogen atom, and m is an integer ranging from 0 to 4, including operating under vacuum at a pressure ranging from approximately 0.01 to 1 mm Hg; so the penetration depths of the vapors inside of the structural discontinuity are from one millimeter to one centimeter, and (b) polymerizing said monomer vapors in situ inside said area of low-cohesion associated with said structural discontinuity to adhere to said structural discontinuity, thereby restoring said solid material or article substantially to its original condition.

2. The process according to claim 1, wherein the para-xylylene monomer or monomeric derivative of formula (1) is obtained by pyrolysis, at a temperature higher than 400° C., of the corresponding (2,2)-paracyclophane of formula (II):

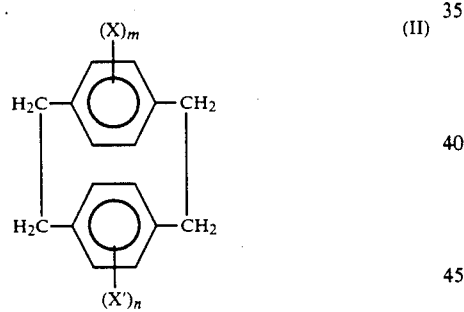

wherein X and X', either alike or different from each other, represent $C_1$–$C_6$ alkyl, $C_6$–$C_{10}$ aryl, $C_7$–$C_{16}$ aralkyl, halogenalkyl or halogen-aralkyl, acetoxy, alkenyl, aminoalkyl, arylamino, cyano, alkoxy, hydroxy, nitro group, atoms of halogens, sulphonic radicals and sulphonic esters, phosphorus-based substituents, sulphonic, sulphuric, alkyl-sulphoxide groups, or hydrogen atoms, and m and n, either equal to or different from each other, are integers ranging from 0 to 4.

3. The process according to claim 1, wherein the para-xylylene monomer is selected from the group consisting of dichloro-p-xylylene, cyano-p-xylylene, iodo-p-xylyene, fluoro-p-xylylene, hydroxymethyl-p-xylylene, ethyl-p-xylylene, methyl-p-xylylene, aminomethyl-p-xylylene, carbomethoxy-p-xylylene, and mixtures thereof.

4. The process according to claim 1, wherein the para-xylylene polymer of the monomer having formula (I) is utilized in association with at least one adhesion-promoting agent.

5. A solid material or article or manufacture exhibiting at least one area of low cohesion associated with at least one structural discontinuity having a section dimension ranging from 0.01 micron to 100 microns, which is consolidated by at least one para-xylylene polymer directly formed inside said structural discontinuity, and containing at least one of the following repeating units:

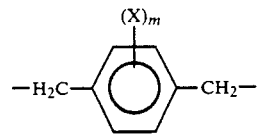

and

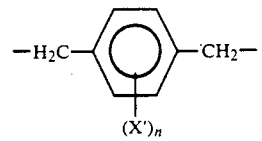

wherein X and X', alike or different from each other, represent a $C_1$–$C_6$ alkyl group, a $C_6$–$C_{10}$ aryl group, a $C_7$–$C_{16}$ aralkyl group, a halogen-alkyl or halogen-aralkyl group, an acetoxy, alkenyl, aminoalkyl, arylamino, cyano, alkoxy, hydroxy, nitro group, a halogen atom, a sulphonic radical or sulphonic ester, or a phosphorus-based substituent, a sulphonic, sulphuric, or alkylsulphoxide group, or a hydrogen atom, and m and n are integers ranging from 0 to 4.

6. The process according to claim 1, wherein the para-xylylene monomer or monomer derivative displays a high diffusion rate and the absence of significant viscosity phenomena.

* * * * *